(12) United States Patent
Hiemer et al.

(10) Patent No.: US 7,239,945 B2
(45) Date of Patent: Jul. 3, 2007

(54) SYSTEM FOR ANALYZING VEHICLE AND DRIVER BEHAVIOR

(75) Inventors: Marcus Hiemer, Karlsruhe (DE); Takanori Matsunaga, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 828 days.

(21) Appl. No.: 10/680,219

(22) Filed: Oct. 8, 2003

(65) Prior Publication Data
US 2004/0243368 A1    Dec. 2, 2004

(30) Foreign Application Priority Data
May 29, 2003    (JP)    ............... 2003-153184

(51) Int. Cl.
*G01M 17/00*    (2006.01)
(52) U.S. Cl. .......................................... 701/29; 701/35
(58) Field of Classification Search ................ 701/1, 701/29, 31, 32, 33, 35, 36, 301, 117
See application file for complete search history.

(56) References Cited

U.S. PATENT DOCUMENTS 6,847,892 B2 * 1/2005 Zhou et al. ................. 701/213

RE38,870 E * 11/2005 Hall ........................... 701/301

FOREIGN PATENT DOCUMENTS

| DE | 4132981 C2 | 8/1992 |
| DE | 42 16 301 A1 | 11/1993 |
| DE | 19509711 C2 | 9/1995 |
| JP | 2003-040061 A | 2/2003 |

* cited by examiner

*Primary Examiner*—Richard M. Camby
(74) *Attorney, Agent, or Firm*—Sughrue Mion, PLLC

(57) ABSTRACT

A system for analyzing vehicle and driver behavior includes: a data preprocessing unit that converts operation information of an in-vehicle electrical system, data available via an in-vehicle data network, and additional information available from an electrical device constituting a vehicle into a format capable of calculation therein; a vehicle model and estimation unit that estimates variables which can not be measured by means of in-vehicle sensors based on the preprocessed data; a model-based reconstruction unit that reconstructs an accident scenario by unifying the preprocessed data and the estimated variables from the vehicle model and estimation unit to a common time stamp; and an assessment unit that assesses vehicle and driver behavior based on the accident scenario reconstructed by the model-based reconstruction unit.

8 Claims, 10 Drawing Sheets

SYSTEM FOR ANALYZING VEHICLE AND DRIVER BEHAVIOR

BACKGROUND OF THE INVENTION

1. Field of the Invention

The present invention generally relates to accident reconstruction systems and, in particular, to systems analyzing and assessing critical driving situations.

2. Description of the Related Art

Today, enormous efforts are undertaken to raise the passenger's security in modern vehicles. Besides air-bag systems and improved vehicle body constructions, control systems play a growing role. Electronic control systems for brake or vehicle dynamics control (VDC) have significantly increased the passenger security in modern vehicles. Note that, as the related prior art documents, there are listed Non-Patent Documents 1, 2, 3, 4, and 5.

A negative effect involved in spread of the vehicle dynamics control (VDC) systems is that they complicate the reconstruction of the events seconds before an accident. Very often, braking traces on the road surface are missing. Braking traces are an important means for the investigations of accident reconstruction specialists. Therefore, the question of guilt cannot clearly be answered.

Furthermore, the number of insurance frauds is rising. Today, it is estimated, that 10% of all insurance events in Germany are manipulated and that the annual financial damage in Germany is higher than 1 billion dollars.

Existing systems for accident reconstruction or so-called event data recorders (EDRs) are either using solely measured information provided by proprietary sensors (e.g., Patent Document 1) or using the vehicle's airbag system.

Another approach for vehicle motion reproduction is solving a set of differential equations (e.g., refer to Patent Document 2).

[Patent Document 1]
German Patent DE 19509711 A (Page 1 to Page 3)
[Patent Document 2]
German Patent DE 4132981 A (Page 1 to Page 4 and FIG. 1 to FIG. 3)
[Non-Patent Document 1]
M. Burckhardt., "Radschlupf-Regelsysteme", Vogel Fachbuchgruppe: Fahrwerktechnik. Vogel Buchverlag, Würzburg, $1^{st}$ edition, 1993
[Non-Patent Document 2]
S. L. Miller et al., "Calculating longitudinal and lateral wheel slip and tire parameters using GPS velocity", Proceedings of the American Control Conference, Society of Automotive Engineers (SAE), Arlington, Va., USA, 2001
[Non-Patent Document 3]
U. Kiencke and L. Nielsen., "Automotive Control Systems", Springer-Verlag, Berlin, Heidelberg, N.Y., 2000
[Non-Patent Document 4]
M. Mitschke., "Dynamik der Kraftfahrzeuge", Band A: Antrieb und Bremsen. Springer-Verlag, Berlin, Heidelberg, N.Y., $2^{nd}$ edition, 1998
[Non-Patent Document 5]
M. Mitschke., "Dynamik der Kraftfahrzeuge", Band C: Fahrverhalten. Springer-Verlag, Berlin, Heidelberg, New York, $2^{nd}$ edition, 1990

The above-mentioned conventional systems involve a problem in that all information necessary for quantitatively analyzing and evaluating the critical driving situations such as accidents cannot be recorded therein.

SUMMARY OF THE INVENTION

The present invention has been made to solve the above-mentioned problems and a first object of the present invention is to provide a system for analyzing vehicle and driver behavior which can record all information necessary for completely analyzing critical driving situations such as an accident.

Also, a second object of the present invention is to provide a system for analyzing vehicle and driver behavior which is mainly used for an accident reconstruction but is additionally applicable as a proof of traffic offense or a means for analyzing unstable driving situations which are barely prevented from causing the accident.

A system for analyzing vehicle and driver behavior according to the present invention includes: a data preprocessing means that converts operation information of an in-vehicle electrical system, data available via an in-vehicle data network, and additional information available from an electrical device constituting a vehicle into a format capable of calculation therein; a vehicle model and estimation means that estimates variables which can not be measured by means of in-vehicle sensors based on the preprocessed data from the data preprocessing means; a model-based reconstruction means that reconstructs an accident scenario by unifying the preprocessed data from the data preprocessing means and the estimated variables from the vehicle model and estimation means to a common time stamp; and an assessment means that assesses vehicle and driver behavior based on the accident scenario reconstructed by the model-based reconstruction means.

DETAILED DESCRIPTION OF THE PREFERRED EMBODIMENTS

First Embodiment

Figure 1:
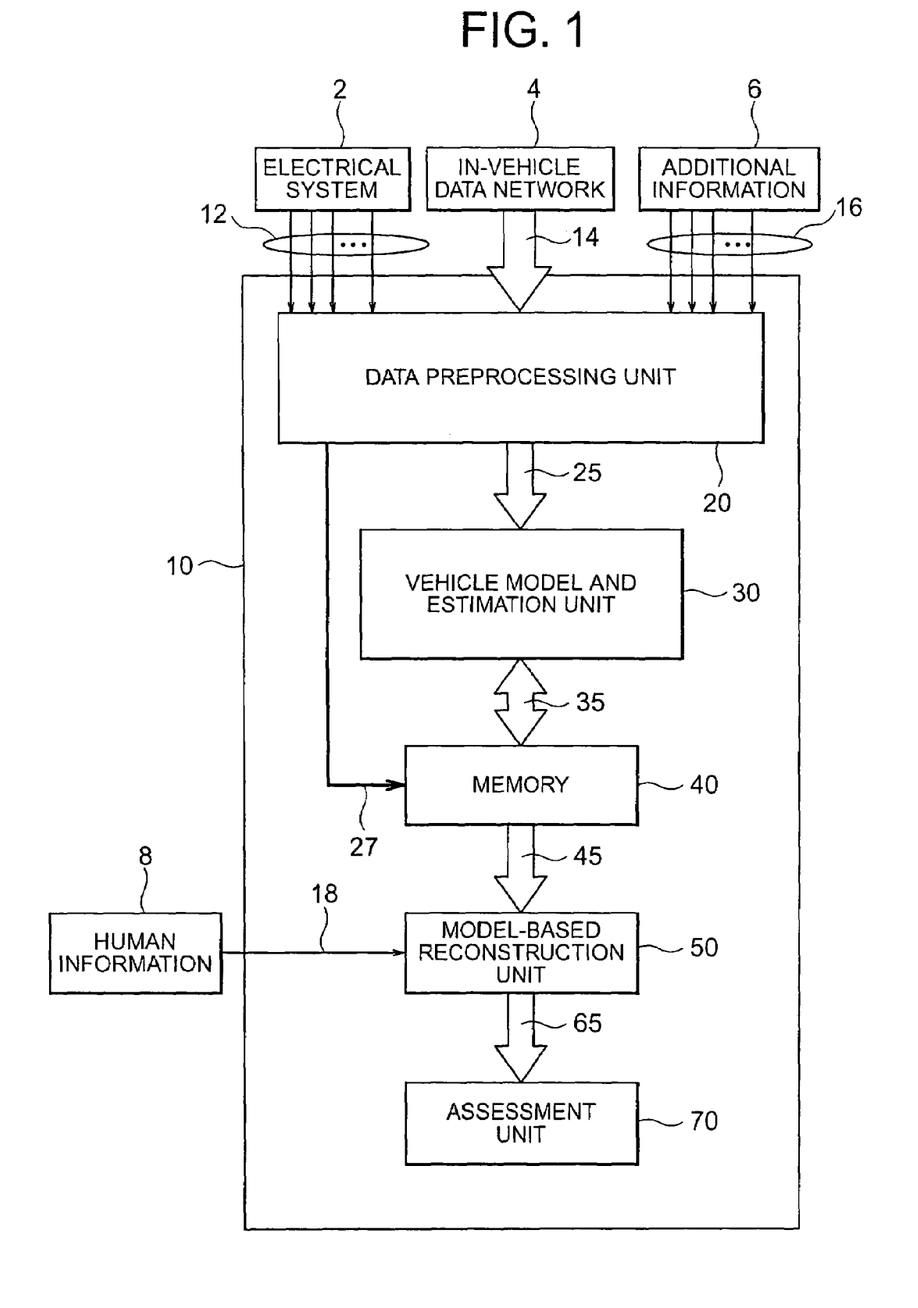
FIG. 1 shows a configuration of a system for analyzing vehicle and driver behavior in accordance with a first embodiment of the present invention.

A description will be given of a system for analyzing vehicle and driver behavior in accordance with a first embodiment of the present invention with reference to the figures. FIG. 1 shows a configuration of the system for analyzing vehicle and driver behavior in accordance with the first embodiment of the present invention. Note that, in the respective figures, like reference symbols indicate identical or equivalent components.

In FIG. 1, a vehicle model and estimation unit (vehicle model and estimation means) 30 and an assessment unit (assessment means) 70 represent the heart of the system 10 of the present invention. By means of the algorithms executed in the vehicle model and estimation unit 30, non-measurable variables important for accident reconstruction can be determined. In this system 10 disclosed, not only differential equations are solved, but also, additionally, estimation techniques are used to achieve states and parameters such as the vehicle mass. For example, if the vehicle mass is estimated, this allows to decide whether the vehicle is overloaded or not. Furthermore, the friction coefficients can be determined to derive information about the vehicle environment. Still further, the vehicle velocity over ground and the vehicle body side slip angle give more information about the vehicle state in critical driving situations.

The system 10 to analyze vehicle and driver behavior because of two following reasons, is capable of achieving more accurate data than systems using only measurable sensor information, which is always subject to measurement errors (noise, offset, drift, or the like).

Firstly, the system 10 of the present invention also uses existing redundancy. For example, using a combination of the wheel speeds and the acceleration signal allows to improve the measurement of amounts of the longitudinal vehicle motion.

Secondly, the vehicle model, which is used in the system 10 furthermore operates like a filter (due to the a priori knowledge hidden in the model itself). That means, that due to the effect of filtering, a higher accuracy can be achieved.

With respect to these reasons, the system 10 guarantees more accurate reconstruction of the accident scenario. However, not only the current "state of the art" in the field of vehicle behavior reconstruction can be improved using the system 10 to analyze vehicle and driver behavior. Based on the data from the vehicle model and estimation unit 30 and the model-based reconstruction unit (model-based reconstruction means) 50, the vehicle and driver behavior in critical driving situations can additionally be assessed. This new step is carried out in the assessment unit 70 which helps to resolve the situation seconds before an accident and which represents an improvement of existing EDR systems, as they are limited to the description of the vehicle motion.

There are some influences important for the analysis of vehicle and driver behavior in critical driving situations.

Firstly, a need exists for an accurate description of the vehicle dynamics and its trajectory. Thus, some non-measurable variables important for accident reconstruction have to be determined. A need also exists to conclude the driver's behavior in critical driving situations. Very often, drivers do not act appropriately before an accident. Therefore, assessing the driver's behavior by analyzing the driver inputs and the resulting vehicle dynamics is a basic requirement for the system 10 of the present invention.

Finally, the vehicle environment significantly influences the behavior of vehicle and driver in the road traffic. Thus, a need exists to conclude the state of the site around the vehicle before and after an accident.

Next, a detailed operation of the system for analyzing vehicle and driver behavior according to the first embodiment will be described with reference to the figures.

The system 10 of the present invention acquires data available in a vehicle. The states of front lights (head lights), rear lights (tail lights), braking, fog lamps, rear gear lights (back lights), turning signals, hazard lamps, and high beam are provided by the electrical system 2. However, not only light information is available from the wiring harness 12. Additionally, the states of the wipers and the horn as well as check lamp states can be recorded. For ambulance vehicles, emergency light and ambulance horn states might be important.

As the signals usually have higher voltages than the maximum voltage, which can be applied to a microprocessor, the signals have to be preprocessed in advance in a data preprocessing unit (data preprocessing means) 20 after receiving them from the wiring harness 12.

Modern vehicles today are equipped with one or more in-vehicle data networks 4. In many cases, such a communications network is represented by a controller area network (CAN).

The system 10 of the present invention reads the available sensor information from the CAN-bus 14 into the data preprocessing unit 20. However, the system 10 of the present invention is capable of reading the data from any other in-vehicle data networks as well, so that it is not limited to the CAN-bus 14. The system 10 of the present invention can also acquire the data directly from the vehicle's engine control unit (ECU).

Finally, the system 10 of the present invention acquires additional information 6 from the electrical systems constituting the vehicle, for example, from the airbag system or the ABS-system, via individual leads 16. All the information is input to the data preprocessing unit 20, where the signals are prepared to be processed in the CPU.

After preprocessing, the data is transmitted via common leads 25 to the vehicle model and estimation unit 30. In the vehicle model and estimation unit 30, the preprocessed data is adapted to estimate non-measurable states and to calculate forces acting on the vehicle and other variables involved in accident reconstruction theory. Additionally, the preprocessed data on leads 25 is enhanced using existing redundancy of the vehicle's sensor information.

After carrying out estimation and calculation regarding vehicle model in the vehicle model and estimation unit 30, the data is written to an internal bidirectional bus 35 and stored in a memory 40. The memory 40 can be represented either by non-volatile memory, for instance, FLASH-ROM or EEPROM or by volatile random access memory (RAM). In the latter case, the memory modules are battery-buffered to prevent the system from undergoing data loss. This is because in the case of an accident, the vehicle power supply could be interrupted and thus the system 10 to analyze vehicle and driver behavior could lose the recorded data.

After the accident occurred, the data is transmitted via an interface 45 to the model-based reconstruction unit 50, where backtracking algorithms are carried out in order to backtrack from the vehicle position after the accident. Additionally, a protocol of all the information from the vehicle model and estimation unit 30 is set up based on a common time stamp in order.

Furthermore, the information collected from the vehicle wiring harness 12 can be used to analyze the signals given by the driver. These signals flow from the data preprocessing unit 20 directly into the memory 40 via a plurality of leads 27. The operation of saving information appropriately in the memory 40 is managed by a microprocessor (not shown in FIG. 1).

Additional human knowledge (human information) 8 about the accident can be input into the model-based reconstruction unit 50 by means of a user interface 18. Additional human knowledge interesting for accident reconstruction experts includes, for instance, the environment around the vehicle like weather conditions, the state of the road (icy condition, scattered condition of dirt, and the like), the curve radius, or the road slope on the spot, provided by the police or by important eye witnesses. Based on this pool of information, the accident scenario is reconstructed in the model-based reconstruction unit 50 and flows through the internal bus 65 into the assessment unit 70.

In the assessment unit 70, all the information about the accident scenario is processed in order to assess the driver and vehicle behavior depending on the environmental conditions around the vehicle.

Figure 2:
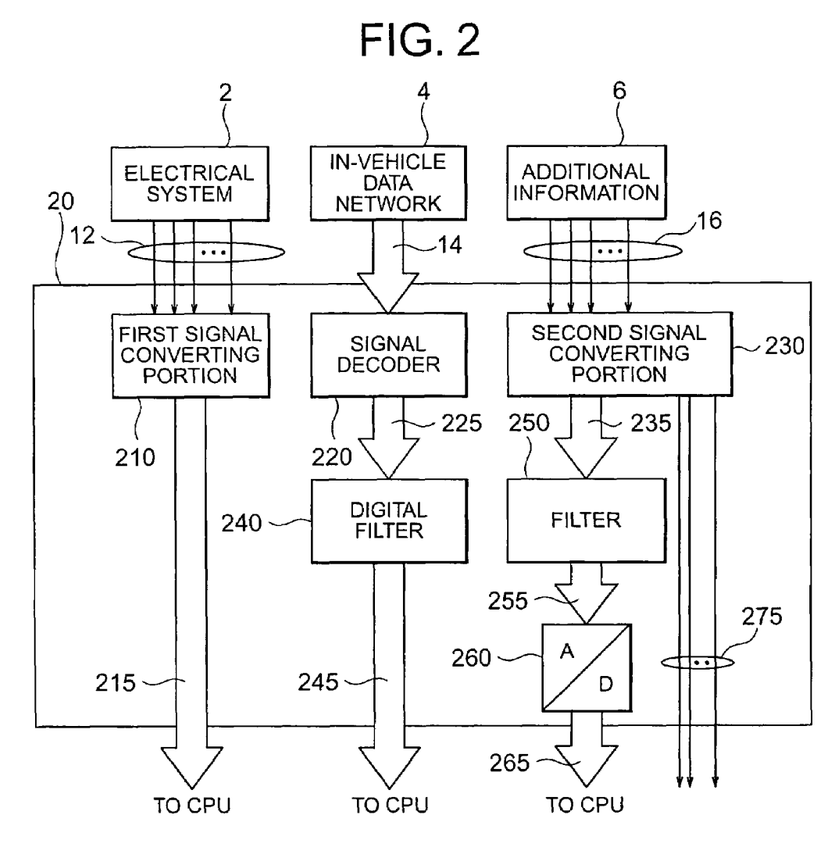
FIG. 2 shows a configuration of a data preprocessing unit of the system for analyzing vehicle and driver behavior in accordance with the first embodiment of the present invention.

FIG. 2 shows the configuration of the data preprocessing unit of the system for analyzing vehicle and driver behavior according to the first embodiment of the present invention.

The information about "plural static states" (light, wiper, horn, and the like) from the electrical system 2 is transmitted via the wiring harness 12 into the data preprocessing unit 20. The signal level from the wiring harness 12 are usually equal to that of the battery power supply of the vehicle. This signal level is extremely high for microprocessor circuits and therefore has to be converted in a first signal converting portion 210 in order to transfer it to the CPU (not shown in FIG. 2) via general leads 215.

Information taken from the CAN-bus 14, any other in-vehicle data network, or the ECU has to be decoded in a signal decoder 220. The signal decoder 220 decrypts the CAN-identifiers to achieve a supplier and a priority of the supplied data.

After decryption in the signal decoder 220, the signals are transmitted via leads 225 to a digital filter 240, which performs low-pass filtering on the decrypted data in order to eliminate high frequent noise. The digital filter 240 can be implemented in a digital signal processor (DSP) or in a microcontroller depending on the necessary processing speed. The digital filter 240 is connected to the CPU (not shown in FIG. 2) by an internal bus 245.

Additional information 6 from vehicle subsystems like the airbag system is input into a second signal converting portion 230 via a set of leads 16. Also, the second signal converting portion 230 also converts the signals in order to processes them in the CPU. Furthermore, in the case of analog signals from the set of leads 16, the signal levels are converted so as to optimally use the margin of an analog to digital converter (ADC) 260. The converted signals from the second signal converting portion 230 are input via leads 235 into a filter 250 to undergo anti-aliasing filtering. The filtered signals are transmitted into the ADC 260 via leads 255, in which the signals are digitalized. From the ADC 260, the digitalized signals are transferred into the CPU via leads 265. On the other hand, the signals that are directly transmitted into the CPU via leads 275 are put in a static state like ABS-switches (operation state judgement signals), which have to be neither filtered nor AD-converted.

Figure 3:
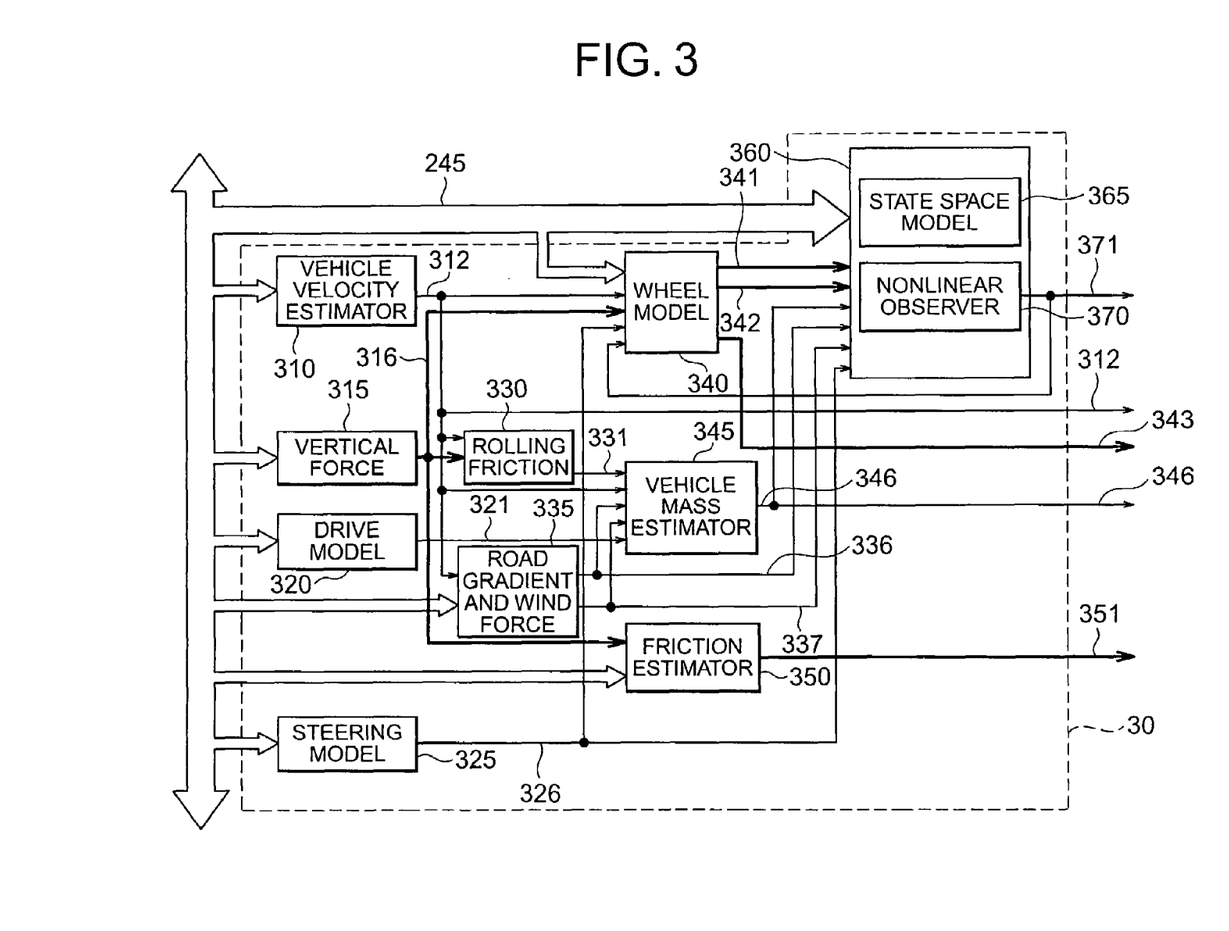
FIG. 3 shows a configuration of a vehicle model and estimation unit of the system for analyzing vehicle and driver behavior in accordance with the first embodiment of the present invention.

FIG. 3 illustrates a configuration of the vehicle model and estimation unit of the system for analyzing the vehicle and driver behavior according to the first embodiment of the present invention.

To the vehicle model and estimation unit 30, the converted and filtered signals from the in-vehicle data networks are supplied via the internal bus 245. The vehicle model and estimation unit 30 operates in algorithms executed on one or more microprocessors. In order to provide a better overview in which results are processed in other subsystems, various subsystems (310, 315, 320, 325, 330, 335, 340, 345, 350, and 360) shown in FIG. 3 are connected by arrows. They represent the signal flows among the components (subsystem) of the vehicle model and estimation unit 30. In reality, the subsystems get the necessary inputs from registers and/or from external memory and also save their calculation results in registers and/or in external memory addressed by one or more microprocessors (not shown in FIG. 3).

A vehicle velocity estimator 310 uses wheel speed and longitudinal acceleration signals from the internal bus 245 in order to output the CoG (center of gravity)-velocity over ground via the leads 312. It represents a block, which uses redundant information in the vehicle to process more accurate data. The vehicle velocity estimator 310 will be described in more detail with reference to FIG. 5.

The vertical force subsystem 315 includes algorithms to determine the vertical wheel forces based on longitudinal and lateral accelerations from acceleration sensors mounted close to the vehicle's center of gravity (CoG). The vertical forces acting on the wheel are needed as inputs in the rolling friction subsystem 330, the wheel model subsystem 340, and the friction estimator 350 and are supplied into these subsystems via the set of leads 316. A detailed derivation of the equations for the vertical wheel forces can be found in Non-Patent Document 3.

The drive model subsystem 320 processes the engine speed and the throttle valve angle provided via the internal bus 245 and outputs via the lead 321 the drive torque on the driven wheels, which is needed in the vehicle mass estimator 345. The drive model subsystem 320 is shown in more detail in FIG. 7.

The steering model subsystem 325 indicates the relationship between the driver's steering input (the steering wheel angle) and the output, i.e., the wheel turn angle, which is provided to the lead 326. The steering model system 325 contains the transmission factor between input angle and output angle. In order to describe the subsystem more accurately, the steering wheel stiffness and the lateral forces acting on the wheel can be considered as well. A detailed description of the steering subsystem 325 together with the setup of the underlying equations can be found in Non-Patent Document 5.

In the rolling friction subsystem 330, the vertical forces acting on the wheel, which are calculated in the vertical force subsystem 315 as well as the estimated CoG-velocity from the vehicle velocity estimator 310 are processed in order to achieve the rolling friction resistance, which are provided via the lead 331 for the vehicle mass estimator 345. The underlying equation to determine the rolling resistance in the rolling friction subsystem 330 is an approximation equation described in Non-Patent Document 4. It is a quartic polynomial including the vehicle velocity, the vertical forces acting on the wheel, and some characteristic rolling resistance coefficients determined in empirical experiments.

The road gradient and wind force subsystem 335 is a unit to determine the road gradient and the wind force. Influences of both of them have to be considered when setting up force balances. The road gradient is transferred to the vehicle mass estimator 345 and to a nonlinear state space model subsystem 360 via the lead 336. Lead 337 supplies to the vehicle mass estimator 345 and the nonlinear state space model subsystem 360 the wind force calculated in the road gradient and wind force subsystem 335. As a result, the road gradient is processed by means of the wheel speeds and the longitudinal accelerations available via the internal bus 245. Derivations between the longitudinal acceleration and the derivative of the wheel speeds (i.e., wheel accelerations) result from false orientation of the acceleration sensor, which is caused by the road gradient. The wind speed is calculated by means of the quadratic relationship between the force and the vehicle's CoG-velocity provided via lead 312.

One of the key subsystems of the vehicle model and estimation unit 30 is the wheel model subsystem 340. In addition to the longitudinal and lateral wheel forces, which are output via the two sets of leads 341 and 342, the tire side slip angles (TSSAs) are calculated. The TSSA is a basic non-measurable variable important in accident reconstruction. Analysis of the TSSAs indicates over- or under-steering driving situations. That is why the TSSAs are determined in the wheel model subsystem 340 and output via a set of leads 343. The wheel model subsystem 340 uses the preprocessed yaw rate signal available via the internal bus 245, the CoG-velocity available via lead 312, the vertical wheel forces from the set of leads 316, the wheel turn angle available via the lead 326, and the vehicle body side slip angle (VBSSA) available via lead 371, which is calculated in the nonlinear observer 370 of the nonlinear state space model subsystem 360. The wheel model subsystem 340 is illustrated in detail in FIG. 6.

In order to conclude whether a certain vehicle is overloaded or not, it is desirable to know the actual vehicle mass. That is why in the vehicle mass estimator 345 a recursive least squares-(RLS-) estimation is carried out in order to output the actual vehicle mass via lead 346. The RLS-estimation method is a general means to estimate variables in real time and thus is familiar to those skilled in identification and estimation theory. Depending on the computational possibilities, basically another parametric estimation method such as the instrumental variable method or the Maximum-Likelihood method could be applied. The mass estimation equations implemented in the vehicle mass estimator 345 are derived from a force balance on the CoG. That is why in addition to the driving force supplied by the drive model subsystem 320 via lead 321 also the resistance forces are processed. The latter ones are available via leads 331 (from the rolling friction block 330), and via leads 336 and 337 (from the road gradient and wind force block 335). Furthermore, the CoG-velocity via lead 312 is needed. The underlying force balance as well as the RLS-method are described in Non-Patent Document 3.

The friction estimator 350 uses the vertical forces acting on the wheel calculated in the vertical force subsystem 315 and provided via the lead 316 as well as the longitudinal acceleration and the wheel speeds available via the internal bus 245. This information is processed in order to get individual friction coefficients on the two axles. The friction coefficients are determined by torque balances on the wheels and by a force balance at the CoG. Solving the resulting set of linear equations provides the friction coefficients (refer to Non-Patent Document 3 for a detailed derivation). The friction coefficients provided via a pair of leads 351 represent a basic variable of the system 10 to analyze vehicle and driver behavior, which are not directly measurable. Knowing the friction coefficient means to have information about the vehicle environment, which is one of the needs defined for the system 10 to analyze the vehicle and driver behavior.

In order to determine the vehicle body side slip angle (VBSSA), a state space model 365 is setup in nonlinear state space model subsystem 360. The VBSSA is a basic variable in accident reconstruction theory as well. It can only be measured with enormous efforts in a standard vehicle. It therefore has to be determined by means of an observer 370, which outputs the VBSSA via lead 371 and outputs it into the wheel model subsystem 340. The nonlinear state model subsystem 360 including the state space model 365 and the nonlinear observer 370 is described in detail in FIG. 4.

The vehicle model and estimation unit 30 illustrated in FIG. 3 is one example to achieve non-measurable variables. Basically, other embodiments of the various subsystems are possible. There are a variety of possibilities depending on the subsystem boundary conditions. The model is capable of determining the vehicle body side slip angle (lead 371), the tire side slip angle (lead 343), the friction coefficient (lead 351), the center of gravity velocity (lead 312) and the vehicle mass (lead 346). Furthermore, the lateral and vertical forces acting on the wheel as well as the drive force are calculated. That is why the model-based system of the present invention is capable of providing more information than existing event data recorders (EDRs) do, thereby achieving accident reconstruction more accurately.

Figure 4:
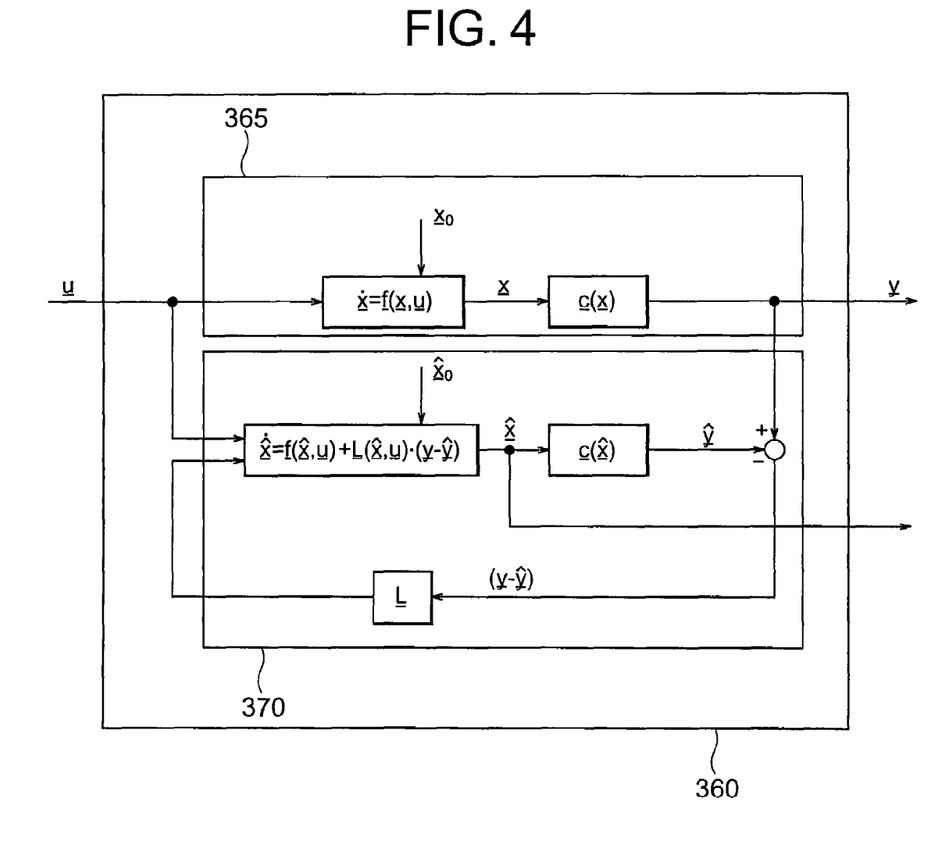
FIG. 4 shows a configuration of a nonlinear state space model of the vehicle model and estimation unit of the system for analyzing vehicle and driver behavior in accordance with the first embodiment of the present invention.

FIG. 4 shows a configuration of the nonlinear state space model of the vehicle model and estimation unit of the system for analyzing the vehicle and driver behavior according to the first embodiment of the present invention.

The process of the state space model 365 of the nonlinear state space model subsystem 360 is described in Equations 1 and 2 as follows:

$$\dot{x} = f(x, u) \quad (1)$$

$$y = c(x) \quad (2)$$

The state vector $\underline{x}$ contains the non-measurable variables, for instance, the vehicle body side slip angle (VBSSA).

Initially, the function $\underline{f}(\underline{x}, \underline{u})$ is setup by means of the force and torque balances at the center of gravity. Hence, measurable variables are replaced by non-measurable ones. For instance, in this particular case, the longitudinal and lateral accelerations are replaced by a relationship with the vehicle body side slip angle (VBSSA). Finally, Equations 1 and 2 contain a relationship between non-measurable states $\underline{x}$, the input vector $\underline{u}$ and the measurement vector $\underline{y}$. The input vector includes, for example, the longitudinal wheel forces and the wheel turn angle.

The nonlinear observer 370 of the nonlinear state space model subsystem 360 is constituted of the process model in Equations 3 and 4 as follows:

$$\dot{\hat{x}} = f(\hat{x}, u) + L(\hat{x}, u) \cdot (y - \hat{y}) \quad (3)$$

$$\hat{y} = c(\hat{x}) \quad (4)$$

As the initial states of process $\underline{x}_0$ and of model $\hat{\underline{x}}_0$ differ, there will be a difference between measured vector $\underline{y}$ and estimated measurement vector $\hat{\underline{y}}$.

The difference $\underline{y}-\hat{\underline{y}}$ is applied to a matrix $\underline{L}$ and fedback to the model, which results in Equations 3 and 4. In order to get accurate estimation of the non-measurable state space vector $\underline{x}$, the estimated state space vector $\hat{\underline{x}}$ must become equal to $\underline{x}$. In other words, the difference between $\underline{x}$ and $\hat{\underline{x}}$ must equal 0. This can be achieved by selecting the elements of the matrix $\underline{L}$ in such a way that the estimation error equals 0 for long time distances. The determination of the elements of $\underline{L}$ is well known to those skilled in control art.

The state space model 365 can be set either linear or nonlinear. In the former case, a simple LUENBERGER-observer provides the elements of $\underline{L}$. In the latter case, a nonlinear observer, for instance, according to ZEITZ, must be implemented. The latter method is described in detail in Non-Patent Document 3, where a nonlinear double track state space model is introduced. The estimation vector $\hat{\underline{x}}$ of the non-measurable state vector $\underline{x}$ is the output of the nonlinear state space model subsystem 360. Using the nonlinear observer 370, it is possible to determine the vehicle body side slip angle (VBSSA) as an important variable in accident reconstruction theory.

Figure 5:
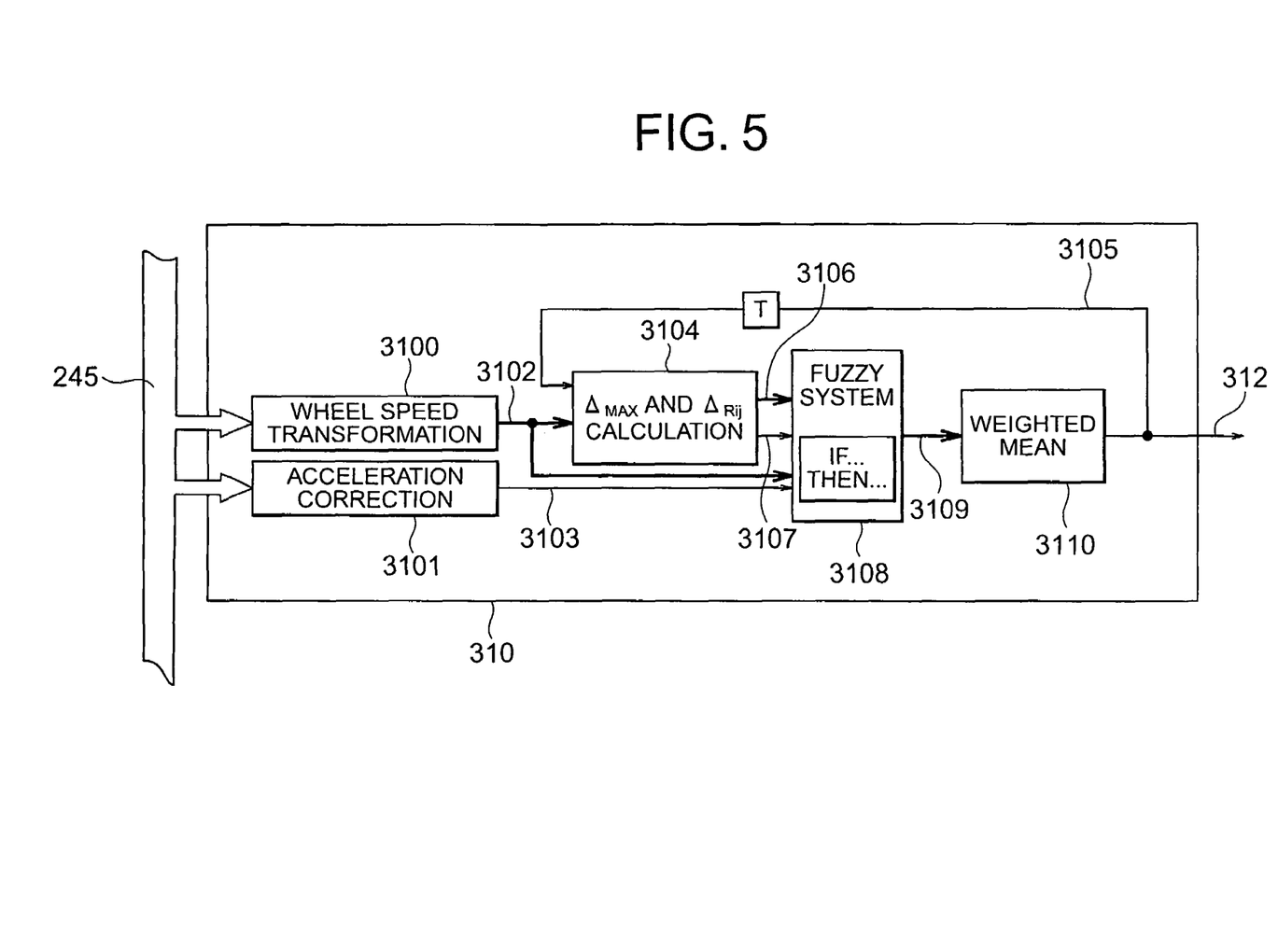
FIG. 5 shows a configuration of a vehicle velocity estimator of the vehicle model and estimation unit of the system for analyzing vehicle and driver behavior in accordance with the first embodiment of the present invention.

FIG. 5 shows a configuration of the vehicle velocity estimator of the vehicle model and estimation unit of the system for analyzing the vehicle and driver behavior according to the first embodiment of the present invention.

The vehicle velocity estimator 310 operates in algorithms executed on a microprocessor. Therefore, the outputs of the subsystems 3100, 3101, 3104, 3108, and 3110 are written to registers within one or more microprocessors and/or to an external memory addressed by one or more microprocessors. In order to provide better structure and overview regarding the vehicle velocity estimator 310, a functional block diagram is used for explanation of the signal flows within the system. In reality, the arrows that point to a register bank and/or to the external memory, correspond to intermediate result and final results are also written thereto for subsequent processing.

The longitudinal acceleration and the wheel speeds are taken from the internal bus 245. The vehicle velocity estimator 310 uses the redundant information of acceleration and wheel speeds in order to determine a more reliable CoG-velocity of the vehicle depending on the actual driving situation. The wheel speed information is not reliable in hard braking and acceleration situations due to slip. In some cases, even the signal failure occurs. The acceleration signal usually involves noise and is susceptible to offset and/or offset drift. According to the driving situation, each of the sensors is weighted more or less. Before applying the signals to the fuzzy-system, they have to be preprocessed to eliminate systematic errors.

The wheel speed transformation subsystem 3100 transforms the speeds at individual wheel positions into the CoG-velocity of the vehicle and thus eliminates errors due to curve driving maneuvers, where the outer wheels are driving faster than the inner ones. The acceleration signals are corrected in an acceleration correction subsystem 3101. In this case, systematic errors due to road gradient have to be eliminated. The transformed wheel speeds output onto the set of leads 3102 are input to a subsystem 3104, where the maximum deviation between the transformed wheel speeds is calculated as well as the velocity differences $\Delta V_{Rij}$ between wheel speeds and the estimated CoG-velocity of the last sampling step.

As a result, the maximum deviation $\Delta_{max}$ is the difference between the highest value and the lowest one of the four wheel speed values at a certain point of time. Therefore, the maximum deviation $\Delta_{max}$ is a measure for the reliability of the wheel speeds in general, whereas the velocity difference $\Delta V_{Rij}$ is a measured amount of the slip on every single wheel. The velocity differences are transmitted via a set of leads 3106, and the maximum deviation is transferred to the fuzzy system 3108 via lead 3107.

The corrected acceleration is another input to the fuzzy system 3108, which is supplied to the fuzzy system 3108 via lead 3103. The heuristic knowledge about a particular driving situation is implemented in a rule base and illustrated as the IF . . . THEN block within the fuzzy system 3108. The rule base contains the knowledge about how a particular signal has to be weighted according to its current reliability. For instance, the wheel speeds will be weighted low in ABS-braking situations due to large braking slip. The complete fuzzy system 3108 with the choice of the membership functions, the rule base, and the defuzzification method can be found in Non-Patent Document 3.

The output of the fuzzy system 3108 via the set of leads 3109 contains weighting factors $k_1$, $k_2$, $k_3$, and $k_4$ for the four wheel speeds and for the acceleration ($k_5$). In a weighted mean subsystem 3110, the estimated center of gravity velocity is determined.

$$\hat{v}_{CoG}(k) = \frac{\sum_{i=1}^{4} k_i v_i(k) + k_5(\hat{v}_{CoG}(k-1) + T_s a \times (k))}{\sum_{i=1}^{5} k_i} \quad (5)$$

The CoG-velocity is output via lead 312, but also fedback via lead 3105 to the subsystem 3104 in order to determine the velocity difference $\Delta V_{Rij}$ for the next sampling step.

The fuzzy velocity estimation method described together with the vehicle velocity estimator 310 represents only one possibility for CoG-velocity estimation. Other approaches are possible by means of a KALMAN-Filter or by evaluating information from a satellite positioning system like GPS (global positioning system) (refer to Non-Patent Document 2).

The CoG-velocity is also one of the basic variables in accident reconstruction, as wheel speeds are too unreliable for reconstruction.

Figure 6:
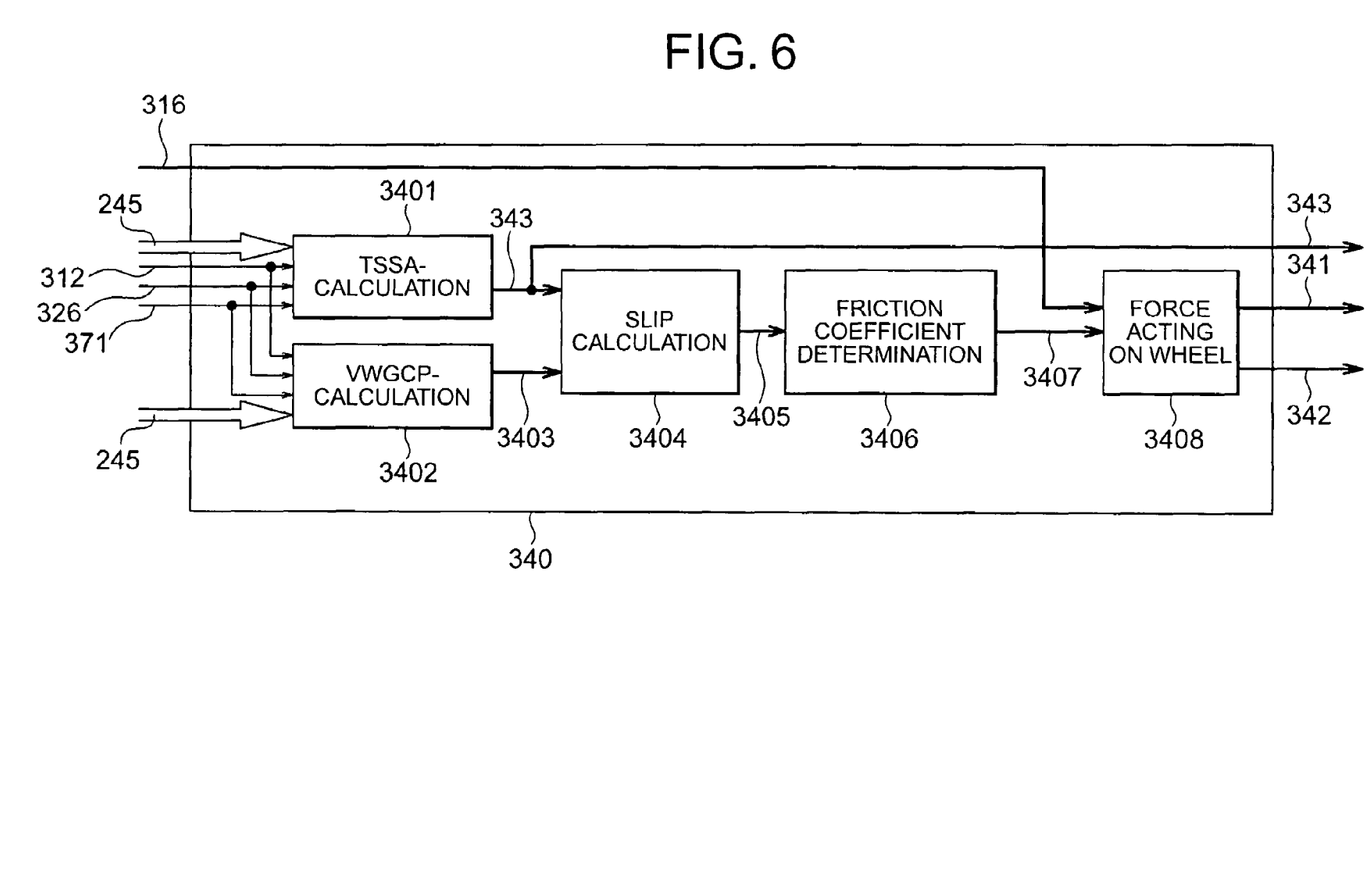
FIG. 6 shows a configuration of a wheel model of the vehicle model and estimation unit of the system for analyzing vehicle and driver behavior in accordance with the first embodiment of the present invention.

FIG. 6 shows a configuration of the wheel model of the vehicle model and estimation unit of the system for analyzing the vehicle and driver behavior in accordance with the first embodiment of the present invention.

The wheel model subsystem 340 operates in algorithms on a microprocessor. Therefore, in reality, intermediate and final results are written to registers of the microprocessor and/or to the external memory addressed by the microprocessor. In order to provide a better overview over the signal flows within the wheel model subsystem 340, FIG. 6 is a block diagram with arrows representing signal flows.

The wheel model subsystem 340 uses information processed in other sub-models as well as information from the internal bus 245 to output the longitudinal and lateral forces acting on the wheel via two sets of leads 341 and 342 as well as the tire side slip angle (TSSA) via a set of leads 343.

In the TSSA-calculation subsystem 3401, the yaw rate signal available via the internal bus 245, the vehicle's CoG-velocity input via lead 312, the wheel turn angle via lead 326, and the vehicle body side slip angle (VBSSA) via the lead 371 are needed to calculate the tire side slip angle (TSSA). The setup of a relationship between the wheel speed and the chassis velocity leads to an equation to calculate the TSSAs. The calculated TSSAs are input via the set of leads 343 into the slip calculation subsystem 3404, which represent one of the outputs of the wheel model subsystem 340.

The velocity of the wheel ground contact point (VWGCP) is determined in the VWGCP-calculation subsystem 3402. The velocity of the wheel ground contact point (VWGCP) represents the real velocity vector at the wheel. The velocity of the wheel ground contact point deviates from the wheel plain due to the tire side slip angle (TSSA).

The VWGCP-calculation subsystem 3402 processes the same inputs as the TSSA-calculation subsystem 3401 and outputs the velocity of the wheel ground contact point (VWGCP) of each wheel via a set of leads 3403. The VWGCP is determined by regarding the different curve radii of the individual wheels and by building up a relationship to the vehicle's motion around its yaw axis.

The tire side slip angle (TSSA) via the lead 343 and the velocity of the wheel ground contact point (VWGCP) via the lead 3403 are input into the slip calculation subsystem 3404, where, based on the definition of Burckhardt (the author of the document in Non-Patent Document 1), the slip is calculated and transmitted via lead 3405 into the friction coefficient determination subsystem 3406.

In the friction coefficient determination subsystem 3406, the characteristic relationship between the wheel slip and the friction coefficient is used to achieve the latter one (i.e., the friction coefficient). This relationship was found in empiric experiments and was implemented in approximation equations well known to those skilled in vehicle engineering. The friction coefficients via the set of leads 3407 and the vertical forces acting on the wheel via the set of leads 316 are input into the wheel force subsystem 3408.

The wheel force subsystem 3408 outputs the longitudinal forces acting on the wheel via the set of leads 341 as well as the lateral forces acting on the wheel via the set of leads 342. The wheel force subsystem 3408 contains the equations, which represent the relationship between the vertical forces acting on the wheel and the friction coefficients. Furthermore, the forces are converted from the wheel coordinate system to the chassis coordinate system.

Figure 7:
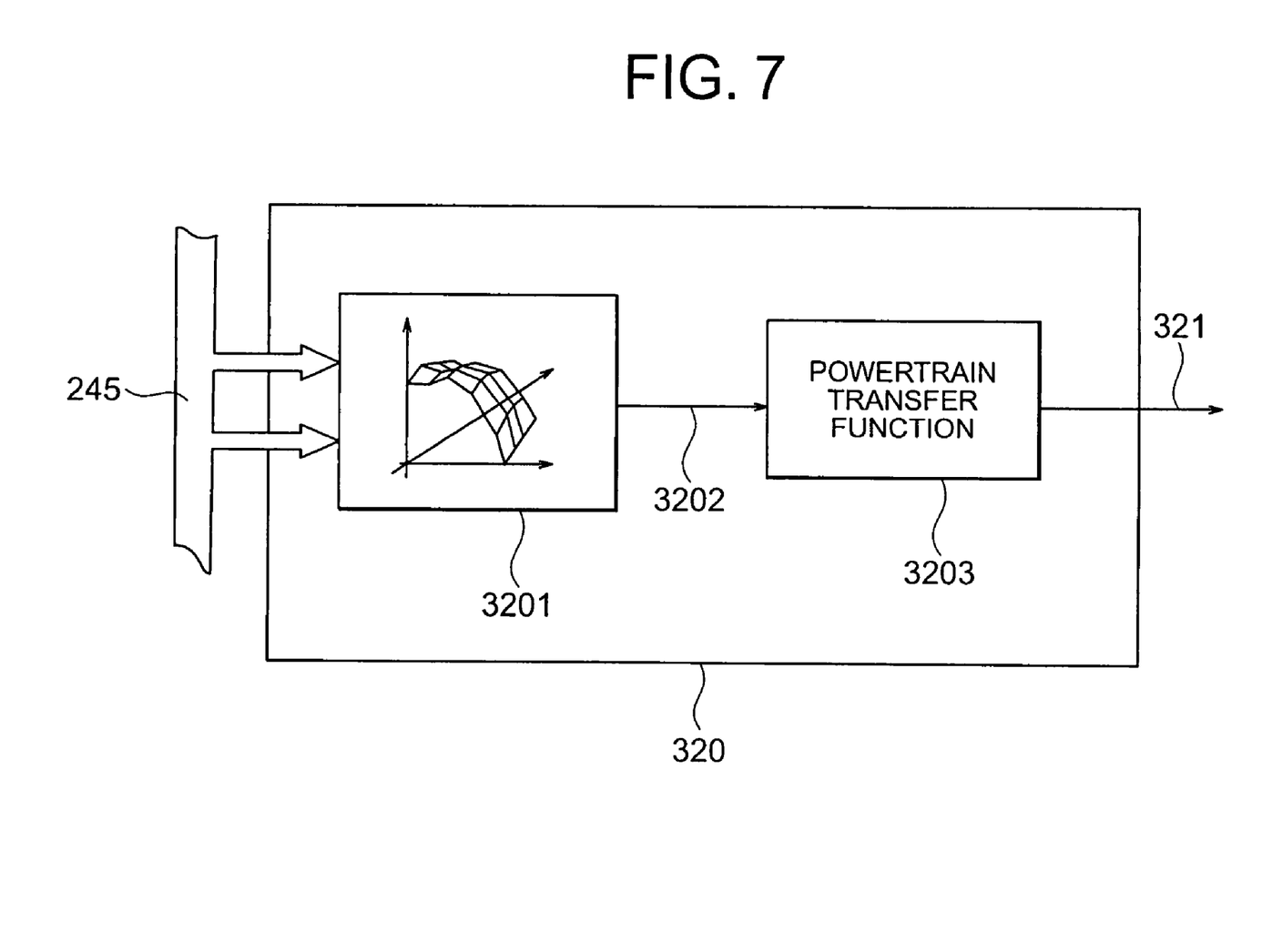
FIG. 7 shows a configuration of a drive model of the vehicle model and estimation unit of the system for analyzing vehicle and driver behavior in accordance with the first embodiment of the present invention.

FIG. 7 shows a configuration of the drive model of the vehicle model and estimation unit of the system for analyzing vehicle and driver behavior according to the first embodiment of the present invention.

In the drive model subsystem 320, the preprocessed engine speed and the throttle valve angle available via the internal bus 245 are input to an engine torque map subsystem 3201. The engine torque map is implemented as a lookuptable in the microprocessor memory. The engine torque map subsystem 3201 outputs the vehicle's engine torque via lead 3202.

For the torque balances on the wheels carried out in the vehicle mass estimator 345 (not shown in FIG. 7), the drive torque directly on the wheels is necessary. Therefore, the vehicle's powertrain is modelled in a powertrain transfer function subsystem 3203. The transfer function of the powertrain implemented in the powertrain transfer function subsystem 3203 can, for instance, be a quadratic system to consider the stiffness and attenuation of the powertrain. The gain of the transfer function has to be adapted according to the selected gear. The drive model subsystem 320 outputs the wheel drive torque via lead 321.

Figure 8:
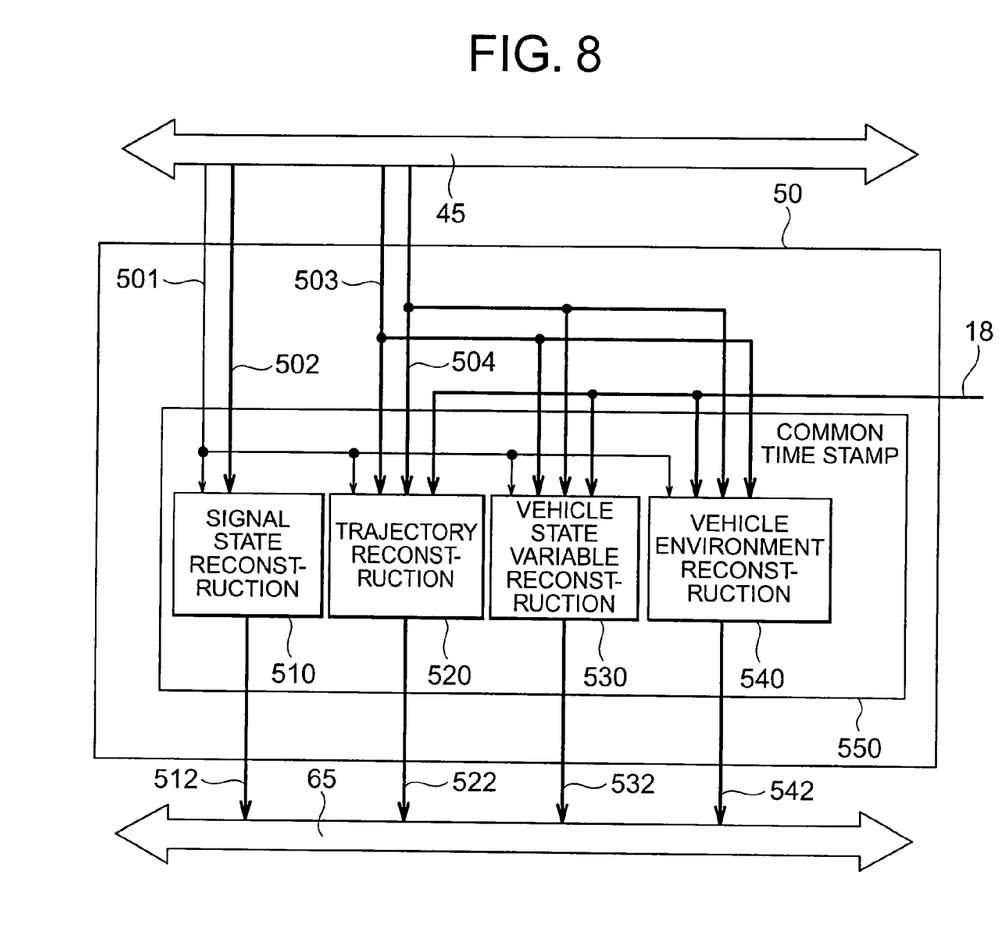
FIG. 8 shows a configuration of a model-based reconstruction unit of the system for analyzing vehicle and driver behavior in accordance with the first embodiment of the present invention.

FIG. 8 shows the model-based reconstruction unit of the system for analyzing vehicle and driver behavior according to the first embodiment of the present invention.

The interface 45 contains all the information 2, 4, and 6 acquired in the vehicle and additional information determined in the vehicle model and estimation unit 30. The purposes of the model-based reconstruction unit 50 are to calculate the physical variables before and after the accident and to integrate these physical variables and all of the other information processed within the unit into a common time stamp (represented by the block 550).

Furthermore, in the model-based reconstruction unit 50, the vehicle motions calculated in a relative coordinate system are anchored into an absolute coordinate system, i.e., a so-called inertial coordinate system, with its point of origin being located in the end position of the vehicle after its standstill. Basically, reconstruction can be carried out by using solely available sensor information. However, due to measurement errors, this may result in the occurrence of large deviation between reconstructed trajectory and "real" trajectory.

The model-based reconstruction unit 50 according to the present invention operates in algorithms executed on a microprocessor, for example, on a personal computer. In order to provide a better overview, the signal flows within the model-based reconstruction unit 50 are shown as arrows. In reality, the input signals, intermediate and final results of the calculations in the subsystems 510, 520, 530, and 540, and the output signals of the model-based reconstruction unit 50 are stored in registers and/or the external memory addressed and managed by one or more microprocessors.

The time stamp, which is either transmitted via the in-vehicle data networks 14 (not shown in FIG. 8) or generated in the local microprocessor and obtained via lead 501 flows into all the subsystems, as the time stamp is the basis to compare the plurality of information available via the interface 45 and thus enables to conclude "what happened when".

The set of leads 502 contains the plural static signals of the vehicle and is, in addition to the time stamp via lead 501, the second input to the signal state reconstruction subsystem 510, where the switching signal of the switch or the power supply is reconstructed as the operation of the driver with time and made available via lead 512.

In the trajectory reconstruction subsystem 520, the position of the vehicle with time is calculated. Therefore, apart from the time stamp acquired via the lead 501, the acquired data via the set of leads 503, the additional information about non-measurable variables gained in the vehicle model and estimation unit 30 (not shown in FIG. 8) via the plural leads 504, and human information 8 via the lead 18 are processed. The latter one, i.e., the human information 8 is, for example, needed in order to fix the point of origin of the vehicle motion. The point of origin represents the position of the vehicle standstill location. This is the position, where the vehicle is located when the recording of data in the system 10 to analyze the vehicle and driver behavior is stopped after an accident.

Fixing the point of origin, for instance, by the police means to fix an inertial coordinate system. Starting from this point, the vehicle trajectory $\underline{x}(n)=[x(n)y(n)]^T$ and the vehicle orientation are reconstructed by using the information available via the two sets of leads 501, 503, and 504, for instance, according to Equations 6 and 7 as follows:

$$x(n+1) = x(n) + \Delta s(n) \cdot \cos\left(\Theta(n) + \frac{\Delta\Theta(n)}{2}\right) \tag{6}$$

-continued $$y(n+1) = y(n) + \Delta s(n) \cdot \sin\left(\Theta(n) + \frac{\Delta\Theta(n)}{2}\right) \quad (7)$$

This means that the information via leads 501, 503 and 504 are processed appropriately in order to determine $\Delta s(n)$ and $\Delta\Theta(n)$ accurately. Thus, $\Delta s(n)$ represents the distance between two consecutive position vectors $\underline{x}(n)$ and $\underline{x}(n+1)$, whereas $\Delta\Theta(n)$ represents the angular motion of the vehicle's CoG-velocity vector between the two consecutive points of time n and n+1. The output of the trajectory reconstruction subsystem 520 is sent to the internal bus 65 via the set of leads 522. The output contains the vehicle trajectory and orientation in an inertial coordinate system starting at the position of the vehicle standstill and ending with the vehicle position at a specified time before the accident.

A vehicle state variable reconstruction subsystem 530 has got the same inputs as the trajectory reconstruction subsystem 520 and outputs parameters and state variables important for accident reconstruction over a common time stamp via a set of leads 532. Variables important for accident reconstruction are, for instance, the tire side slip angles, the vehicle body side slip angle, the longitudinal, lateral and vertical forces acting on the wheel, and the velocity over ground.

In a vehicle environment reconstruction subsystem 540, which has got the same inputs as the trajectory reconstruction subsystem 520 and the vehicle state variable reconstruction subsystem 530, the friction coefficient over the time is determined and additional information like the road and light conditions or the curve radius is output via the set of leads 542. All of the information produced in the model-based reconstruction unit 50 is input to the internal bus 65, where it is transmitted to the assessment unit 70 shown in FIG. 9.

Figure 9:
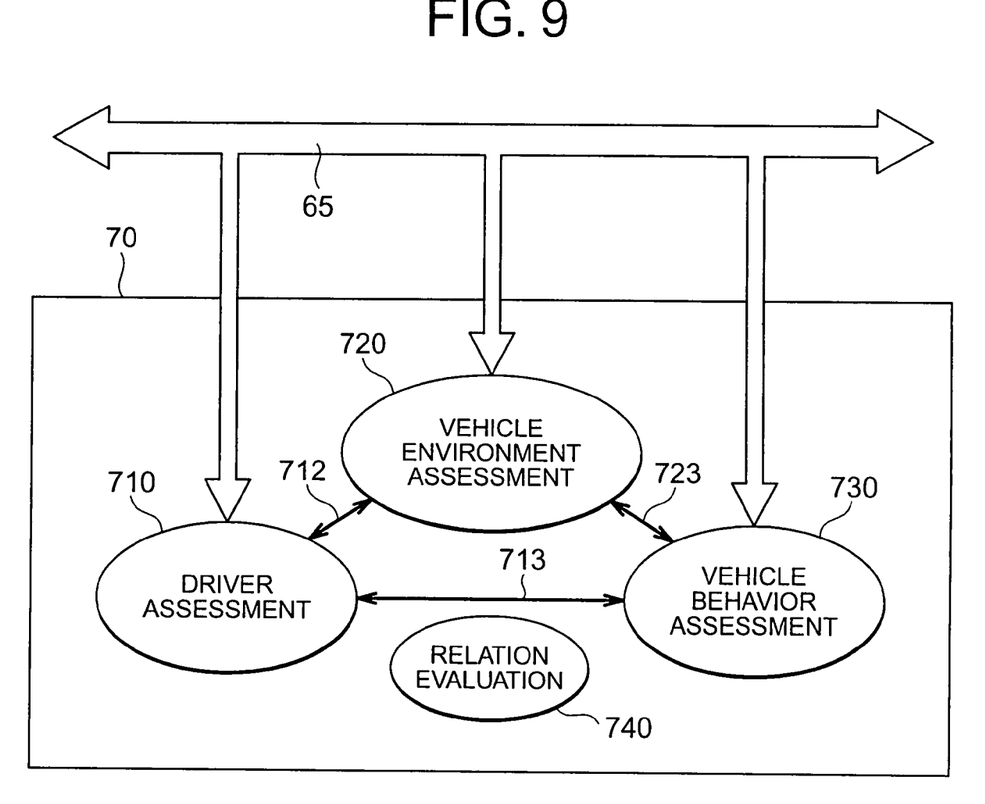
FIG. 9 shows a configuration of an assessment unit of the system for analyzing vehicle and driver behavior in accordance with the first embodiment of the present invention.

FIG. 9 shows a configuration of the assessment unit of the system for analyzing the vehicle and driver behavior according to the first embodiment of the present invention.

In contrast to the model-based reconstruction unit 50, where the physical variables are calculated, in the assessment unit 70, a judgement of the physical variables is carried out. The division of reconstruction and assessment is made by purpose, because the assessment is carried out depending on individual laws in a particular country, whereas the calculation of the physical variables in the model-based reconstruction unit 50 (not shown in FIG. 9) has to be carried out in any case.

Information about the accident scenario such as the vehicle trajectory, the "plural static states", or testimony of eye-witnesses is supplied into the assessment unit 70 from internal bus 65 and further supplied into the individual assessment subsystems for the driver assessment subsystem 710, the vehicle environmental assessment subsystem 720, and the vehicle behavior assessment subsystem 730.

In the driver assessment subsystem 710, for instance, a judgement is made as to whether the driver was driving too fast or not. This judgement, however, depends on human information by the police (e.g. if the accident occurred in a speed-limit zone, or the like) or depends on the juristic peculiarities of a country (e.g. if there is a certain speed limit applicable to general country roads, or the like).

Furthermore, the judgement depends on the vehicle behavior assessed in the vehicle behavior assessment subsystem 730. For instance, if the brakes failed, this cannot be rated as the driver's fault. Thus, interaction between vehicle and driver behaviors has to be considered, which is illustrated by the bidirectional arrow 713 in FIG. 9.

Additional interactions between the vehicle environment assessment subsystem 720 ("e.g. icy road") and the driver behavior indicated by bidirectional arrow 712 and between the vehicle environment assessment subsystem 720 and the vehicle behavior (bidirectional arrow 723) have to be taken into consideration. Also, the assessment unit 70 includes a relation evaluating subsystem 740 that evaluates the relationship among the operation and behavior of the driver in the driver assessment subsystem 710, the vehicle environment by the vehicle environment assessment subsystem 720, and the vehicle behavior by the vehicle behavior assessment subsystem 730.

In order to achieve measures to describe wrong driver or vehicle behavior, in addition to the wheel speed, for example, the tire side slip angle (TSSA) on the trajectory of the front and rear wheels can be taken to conclude whether the vehicle was in an understeering or oversteering state. Together with information about steering inputs by the driver, its behavior in curves can be assessed. The ratio of vehicle body side slip angle (VBSSA) and vehicle velocity as well as the ratio of the road radius and the vehicle velocity have to be considered and compared to the driver inputs. If, for instance, a certain threshold for the above-mentioned ratios is underrun or exceeded, an inadequate driver behavior can be detected.

Another example to assess the vehicle condition is available by analyzing the wheel speeds. If, for instance, the wheel speeds do not take numerical value showing a significant vehicle velocity drop for a short time period, a failure in the ABS-system can be concluded and the driver can be exempt from liability. Due to individual regulations in different countries, the assessment unit 70 has to be adapted to different boundary conditions. The assessment unit 70 plays an outstanding role in the description of an accident situation. The vehicle model and estimation unit 30 (not shown in FIG. 9) as well as the model-based reconstruction in the model-based reconstruction unit 50 (not shown in FIG. 9) are necessary steps in order to assess the driver and vehicle behavior in critical driving situations accurately in the assessment unit 70.

Figures 10A, 10B:
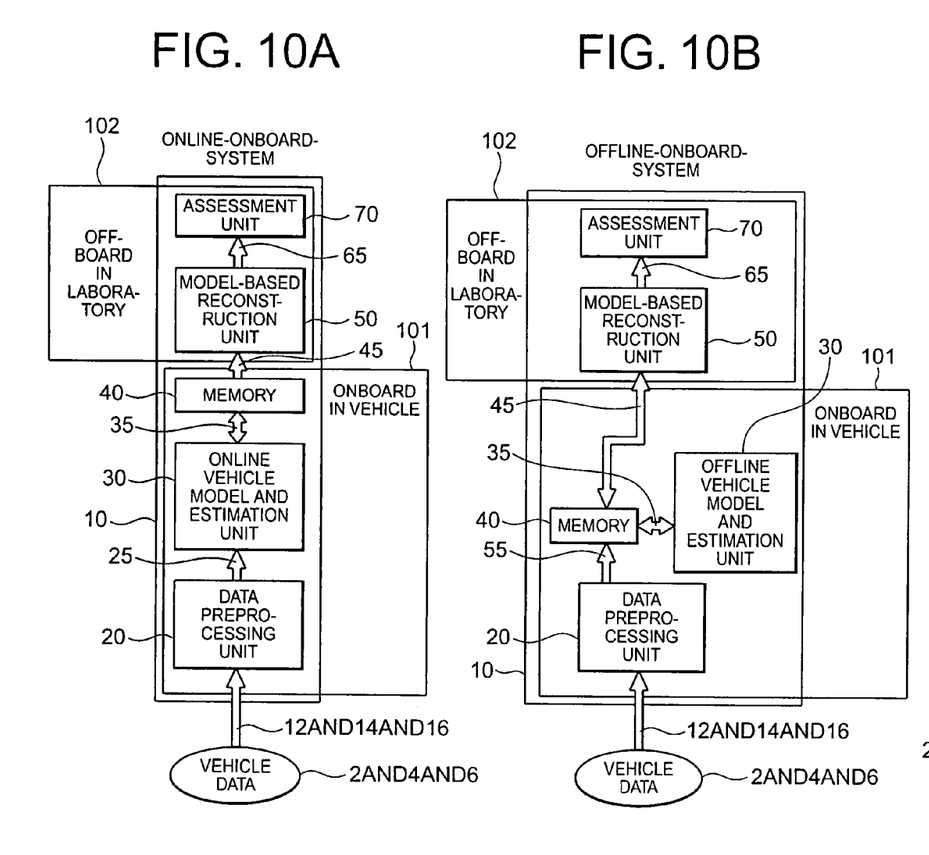
FIGS. 10A to 10C show three different configurations of the system for analyzing vehicle and driver behavior in accordance with the first embodiment of the present invention.
Figure 10C:
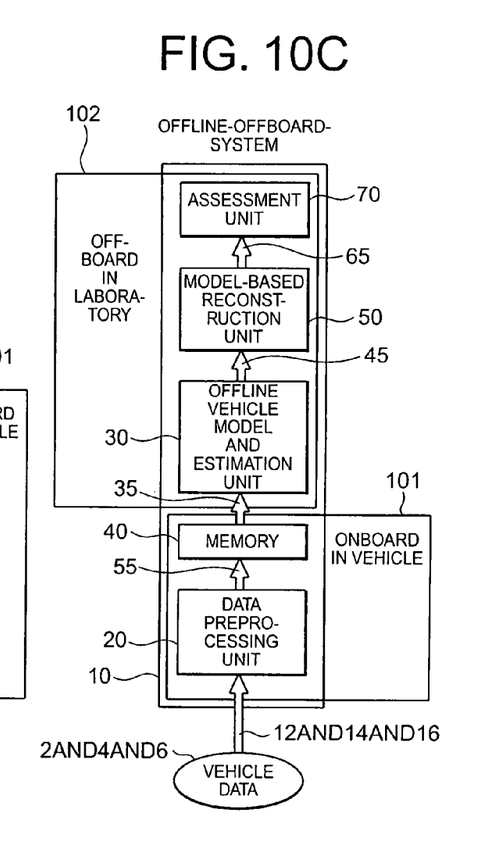

FIG. 10A, FIG. 10B and FIG. 10C show three different configurations (system architectures) of the system for analyzing vehicle and driver behavior according to the first embodiment of the present invention.

FIG. 10A is a block diagram showing a so-called "online-onboard-system". Available vehicle data 2, 4, and 6 are input via a plurality of leads 12 and 16 and via the in-vehicle data network 14 into the data preprocessing unit 20 of the system 10 to analyze vehicle and driver behavior.

The preprocessed data is transmitted via a set of leads and an internal bus 25 into the vehicle model and estimation unit 30. The vehicle model calculations and estimation algorithms are carried out in real time in the vehicle model and estimation unit 30 ("online"). The bidirectional internal bus 35 is used for data exchange with the memory 40 in order to save and load intermediate results.

After the accident occurred, the estimated and calculated data as well as the preprocessed measurement signals are uploaded via an interface 45 to the model-based reconstruction unit 50. In the model-based reconstruction unit 50, all the information acquired within the vehicle model and estimation unit 30 is unified to a common time stamp and the accident scenario is reconstructed.

From the model-based reconstruction unit 50, the reconstructed accident scenario is input into the assessment unit 70 via the internal bus 65. In the assessment unit 70, the vehicle and driver behavior as well as the environmental conditions are assessed.

The system architecture illustrated in FIG. 10A is characterized, by one part ("onboard") 101 being executed in the vehicle. This part contains the data preprocessing in the subsystem 20 and the realtime model calculations and estimation in the subsystem 30. The model-based reconstruction carried out in subsystem 50 as well as the assessment of the accident scenario in the subsystem 70 take place offboard in the laboratory (block 102), but not within the vehicle.

FIG. 10B is a block diagram showing a so-called "offline-onboard-system". The vehicle data 2, 4, and 6 are input via a plurality of leads 12 and 16 and via the in-vehicle data network 14 into the data preprocessing unit 20 of the system 10 to analyze vehicle and driver behavior.

The data is saved in a memory 40 over the internal bus 55. After the accident occurred, the CPU (not shown in FIG. 10B) triggers itself to start calculating the vehicle models and to carry out the model-based estimation in the subsystem 30. The "offline-onboard-system" is not a realtime system. The bidirectional internal bus 35 allows to write intermediate and final results into the memory 40 and to reload the results if necessary.

After the mathematical calculations are finished, the vehicle model calculations and estimation results are uploaded from the memory 40 to the model-based reconstruction unit 50 by means of an interface 45. In the model-based reconstruction unit 50, the acquired data and the additional data determined in the vehicle model and estimation unit 30 are unified to a common time stamp and the accident scenario is reconstructed.

The reconstructed accident scenario is input into the assessment unit 70 via the internal bus 65. In the assessment unit 70, the vehicle and driver behavior as well as the environmental conditions are assessed.

The "offline-onboard-system" carries out data preprocessing in the subsystem 20 as well as wheel model calculation and estimation in the subsystem 30 onboard, i.e., in the vehicle (block 101). In contrast to the "online-onboard-system" introduced in FIG. 10A, the calculations in the subsystem 30 are not calculated in real time ("offline"). Model-based reconstruction in the subsystem 50 and the assessment of the accident scenario in the subsystem 70 take place in the laboratory ("offboard" shown in the block 102) and do not take place within the vehicle.

The "offline-offboard-system", which is shown in the block diagram of FIG. 10C functions as follows: the vehicle data 2, 4, and 6 are supplied via a plurality of leads 12 and 16 and via the in-vehicle data network 14 into the data preprocessing unit 20 of the system 10 to analyze vehicle and driver.

The data is saved via the internal bus 55 in a memory 40. From the memory 40, the data is uploaded via an interface 35 to a personal computer (PC) in a laboratory, after the accident occurred. On the PC, the respective calculations are carried out in the vehicle model and estimation unit 30 ("offline").

After the model calculations and estimations are executed, the results are input into the model-based reconstruction unit 50 via an interface 45. In the model-based reconstruction unit 50, the acquired data and the information determined in the vehicle model and estimation unit 30 are unified to a common time stamp and the accident scenario is reconstructed.

The reconstructed accident scenario is input into the assessment unit 70 via the internal bus 65. In the assessment unit 70, the vehicle and driver behavior as well as the environmental condition are assessed.

The "offline-offboard-system" can also be divided into an onboard block 101, which represents parts of the system installed in the vehicle. In the "offline-offboard-system", only the data preprocessing unit 20 and the act of saving the measured and preprocessed data in the memory 40 are carried out onboard in the block 101. The vehicle model and estimation calculations, the model-based reconstruction, and the assessment of the accident scenario are processed in the laboratory, which means "offboard" in block 102 and not in real time ("offline").

This distinguishes the "offline-offboard-system" of FIG. 10C from the "online-onboard-system" presented in FIG. 10A and the "offline-onboard-system" shown in FIG. 10B, where only model-based reconstruction and assessment are taking place outside the vehicle (offboard).

As described above, the system for analyzing vehicle and driver behavior according to the present invention makes it possible to solve the differential equation representing the vehicle behavior by means of the vehicle model and estimation unit as well as to obtain the non-measurable variables in the in-vehicle sensor, such as the vehicle behavior or the vehicle mass, through the estimation technique. Further, according to the present invention, there can be achieved an effect of recording information necessary for quantitatively analyzing the critical driving situations such as accident in the system. Further it is possible to clarify the interaction among the driver behavior, the vehicle behavior, and the environment condition by the assessment unit. Accordingly, there can be achieved another effect that the system can be used as a proof of traffic offenses or the means for analyzing the unstable driving situations which are barely prevented from causing the accident.

What is claimed is:

1. A system for analyzing vehicle and driver behavior, comprising:
    a data preprocessing means that converts operation information of an in-vehicle electrical system, data available via an in-vehicle data network, and additional information available from electrical control devices of the vehicle into a format capable of calculation therein;
    a vehicle model and estimation means that estimates non-measurable variables in an in-vehicle sensor based on the preprocessed data from the data preprocessing means;
    a model-based reconstruction means that reconstructs an accident scenario by unifying the preprocessed data from the data preprocessing means and the estimated variables from the vehicle model and estimation means to a common time stamp; and
    an assessment means that assesses vehicle and driver behavior based on the accident scenario reconstructed by the model-based reconstruction means.

2. A system for analyzing vehicle and driver behavior according to claim 1, wherein the data preprocessing means includes:
    a signal converting portion that converts signal levels of the operation information of the in-vehicle electrical system and the additional information available from the electrical device constituting the vehicle into a signal level used in a microprocessor;

a signal decoding portion that decodes the data available from the in-vehicle data network;

a filter processing portion that performs filter processing on a signal from at least one of the signal converting portion and the signal decoding portion; and an analog to digital converting portion that converts an analog signal from the signal converting portion into a digital signal.

3. A system for analyzing vehicle and driver behavior according to claim 1, wherein the vehicle model and estimation means includes:

a vehicle velocity estimation portion that determines a vehicle velocity at a center of gravity as the non-measurable variable in the in-vehicle sensor based on the preprocessed data from the data preprocessing means;

a drive model portion that determines a drive torque using a drive model obtained by constructing a vehicle powertrain in an equation based on the preprocessed data from the data preprocessing means;

a vehicle mass estimation portion that estimates a vehicle mass as the non-measurable variable in the in-vehicle sensor based on the preprocessed data, the vehicle velocity at the center of gravity, and the drive torque;

a wheel model portion that calculates a tire side slip angle and forces acting on a wheel as the variables which can not be measured by means of in-vehicle sensors using a wheel model obtained by constructing the wheel in an equation based on the preprocessed data and the vehicle velocity at the center of gravity; and a state space model portion that derives a vehicle body side slip angle as the non-measurable variable in the in-vehicle sensor using a state space model obtained by constructing a running vehicle state in an equation based on the preprocessed data, the vehicle velocity at the center of gravity, the vehicle mass, and the forces acting on the wheel.

4. A system for analyzing vehicle and driver behavior according to claim 1, wherein the model-based reconstruction means includes:

a signal state reconstruction portion that reconstructs a signal available through an operation of a driver with time among the preprocessed data from the data preprocessing means;

a trajectory reconstruction portion that reconstructs the vehicle position and its orientation based on the preprocessed data from the data preprocessing means, the estimated variable from the vehicle model and estimation means, and data input from outside;

a vehicle state variable reconstruction portion that determines variables with time, which represent a vehicle state based on the preprocessed data from the data preprocessing means, the estimated variable from the vehicle model and estimation means, and the data input from outside; and a vehicle environment reconstruction portion that reconstructs a vehicle environment with time based on the preprocessed data from the data preprocessing means, the estimated variable from the vehicle model and estimation means, and the data input from outside.

5. A system for analyzing vehicle and driver behavior according to claim 1, wherein the assessment means includes:

a driver assessment means that assesses an operation and behavior of a driver based on the accident scenario reconstructed by the model-based reconstruction means;

a vehicle behavior assessment means that assesses a vehicle behavior based on the accident scenario reconstructed by the model-based reconstruction means;

a vehicle environment assessment means that assesses a vehicle environment based on the accident scenario reconstructed by the model-based reconstruction means; and a relation evaluating means that evaluates a relationship among the operation and the behavior of the driver by driver assessment means, the vehicle behavior by the vehicle behavior assessment means, and the vehicle environment by the vehicle environment assessment means.

6. A system for analyzing vehicle and driver behavior according to claim 1, wherein:

the data preprocessing means and the vehicle model and estimation means are carried out in the vehicle;

the vehicle model and estimation means is carried out in real time; and the model-based reconstruction means and the assessment means are carried out outside the vehicle.

7. A system for analyzing vehicle and driver behavior according to claim 1, wherein:

the data preprocessing means and the vehicle model and estimation means are carried out in the vehicle; and the model-based reconstruction means and the assessment means are carried out outside the vehicle.

8. A system for analyzing vehicle and driver behavior according to claim 1, wherein:

the data preprocessing means is carried out in the vehicle; and the vehicle model and estimation means, the model-based reconstruction means, and the assessment means are carried out outside the vehicle.

* * * * *